United States Patent Office.

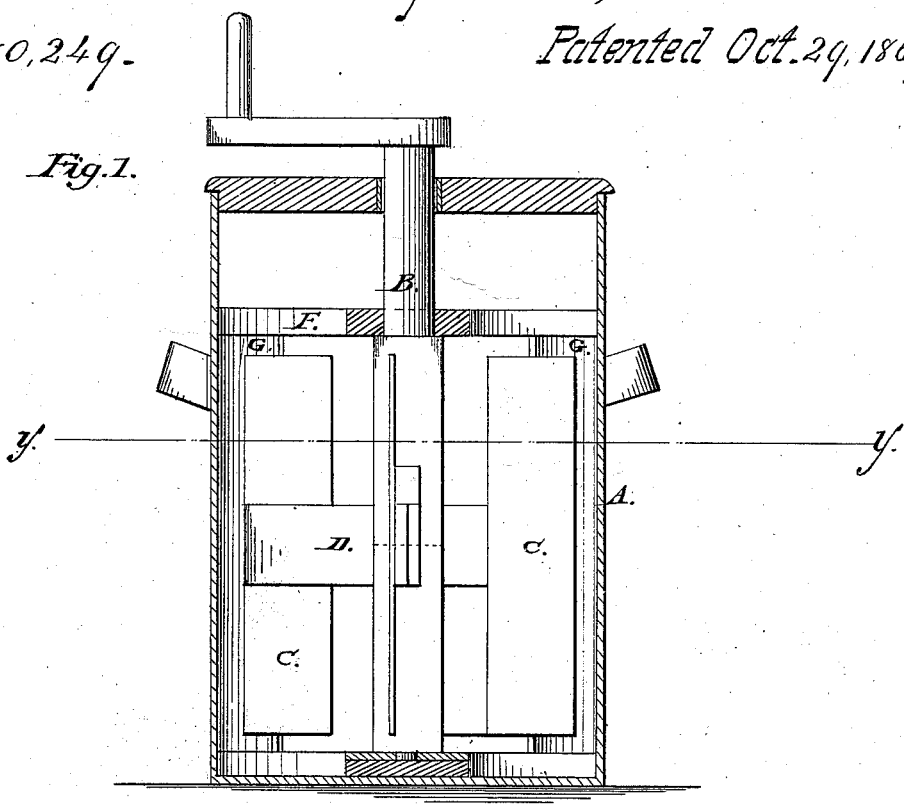
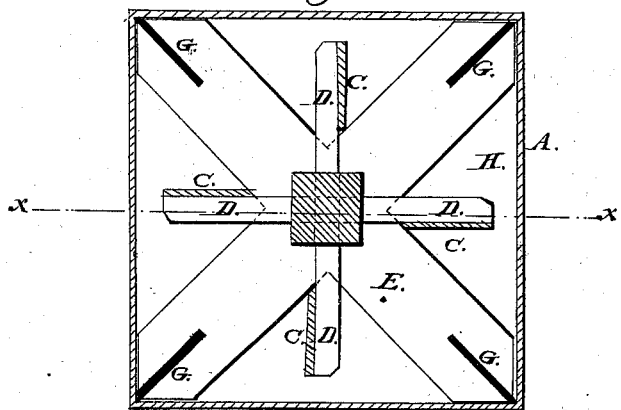

WILLIAM NEWBERRY, OF CLARKSVILLE, MISSOURI.

*Letters Patent No. 70,249, dated October 29, 1867.*

IMPROVEMENT IN CHURNS.

*The Schedule referred to in these Letters Patent and making part of the same.*

TO ALL WHOM IT MAY CONCERN:

Be it known that I, WILLIAM NEWBERRY, of Clarksville, in the county of Pike, and State of Missouri, have invented a new and useful Improvement in Churns; and I do hereby declare that the following is a full, clear, and exact description thereof, which will enable others skilled in the art to make and use the same, reference being had to the accompanying drawings, forming a part of this specification.

This invention relates to a new and improved method of constructing churns, and the invention consists in arranging an upright shaft, with wings or dashers attached thereto, which are revolved within the churn, and also in the arrangement of stationary crosses and wings in the angles of the churn, as will be hereinafter more fully described.

Figure 1 is a central vertical section of the churn through the line $x\ x$ of fig. 2.

Figure 2 is a horizontal section through the line $y\ y$ of fig. 1.

Similar letters of reference indicate corresponding parts.

The churn is square or angular in form, as seen in fig. 2, and at each of the four angles are fixed stationary wings. The arrangement is such that the revolving wings, which are attached to the upright shaft, revolve within and in proximity to the edges of the fixed wings.

A represents the box or body of the churn. B is the upright shaft. C represents the revolving dashers, which are attached to arms which pass through the shaft. D represents the arms. E represents a cross, which rests on the bottom of A, the centre of which forms a stop for the upright shaft. F is another cross in the upper part of the churn, through the centre of which the shaft passes, as seen in the drawing. G represents the stationary wings, which are attached at their upper and lower ends to these crosses, occupying the angles of the churn, as seen in the drawing.

The revolving dashers C describe the circle marked H, fig. 2. The crosses, with the wings G attached to them, are, with the shaft and revolving dashers, removable from the churn at pleasure, for cleaning or other purposes.

In the ordinary round or barrel-churn the cream is given a rotary motion. In my churn the tendency of the revolving motion of the dashers is to throw the cream into the angles and against their stationary wings, thus destroying all rotary motion in the cream, and giving it the necessary agitation, and separating the particles by friction in the most perfect manner.

These churns are very simple in their construction, and are cheaply made, while they are most efficient in their operation.

Having thus described my invention, what I claim as new, and desire to secure by Letters Patent, is—

1. The crosses E and F, with the stationary wings G attached thereto, and arranged substantially as shown and described.

2. The stationary wings G in the angles of a square or angular churn, whether the churn has more or less angles, substantially as described.

3. In combination with the crosses E F and wings G, I claim the revolving dashers C, substantially as and for the purposes set forth.

WILLIAM NEWBERRY.

Witnesses:
H. B. MILLER,
J. J. WATSON.